United States Patent Office.

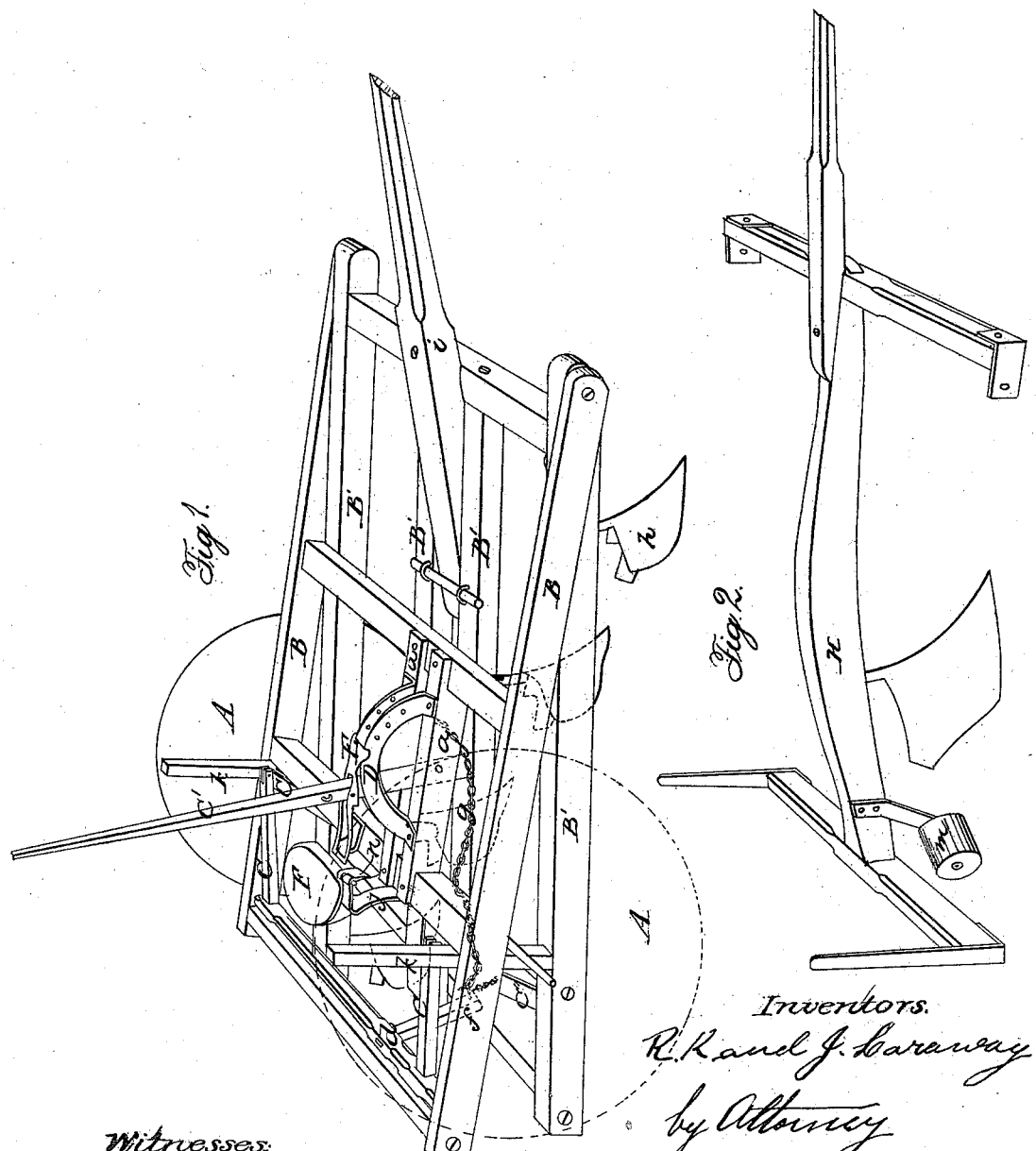

RANSOM K. LARAWAY AND JAROME LARAWAY, OF BATTLE CREEK, MICHIGAN.

*Letters Patent No. 62,641, dated March 5, 1867.*

IMPROVEMENT IN PLOUGHS.

*The Schedule referred to in these Letters Patent and making part of the same.*

TO ALL WHOM IT MAY CONCERN:

Be it known that we, RANSOM K. LARAWAY and JAROME LARAWAY, of Battle Creek, in the county of Calhoun, and in the State of Michigan, have invented a new and useful Improvement in the Mode of Raising and Lowering the Ploughs of Cultivators or Gang-Ploughs and also the single plough; and we do hereby declare that the following is a full, clear, and exact description thereof, reference being had to the accompanying drawings, in which—

Figure 1 is a perspective view of the frame gang-ploughs and means of raising and lowering the same.

Figure 2 is a perspective view of the cultivator to be attached to the frame when the cultivator is to be used instead of the gang-plough.

To enable others to make and use our invention, we will proceed to describe its construction and operation, after first describing the nature of our invention.

The nature of our invention consists in the manner hereinafter described of raising and lowering the plough or cultivator, and of converting readily our invention into a cultivator or gang-plough as hereinafter described.

In fig. 1, in the construction of our plough, using the material ordinarily used for such purposes, A the wheels on which the invention rests and is propelled, and which are attached to an axle such as is commonly used. B the frame, to the main piece of which is fastened a short metal arm on each side. B' the movable frame to which the ploughs (four) are attached. This frame is made of four pieces. Longitudinal to the wheels, on each one of them, a plough is attached, and two cross-pieces fit together, forming the movable frame. The ploughs are attached to the pieces of the frame in any known or convenient mode, so as to make them firm and steady. C' the lever, which is placed near the seat F, and is under the control of the driver, and is by him operated to raise and lower the frame and ploughs, H. On the lower end of this lever it is formed into a half circle, or has on it a cam in shape of a half circle. This lever has its fulcrum on a pivot passing through two braces, forming a portion of the frame B, and marked $a\ a$. Attached to this lever is a chain, G, falling into or on the semicircle on the lower end of the lever, and descending down to the lower end of the arm $f$, to which it is firmly attached, for raising and lowering said frame. On the braces $a\ a$ is fixed an arch, made of metal, which serves as a ratchet, into which the pawl E falls, which pawl is attached to lever C' by a pivot, and which is for holding the frame B' in place, as desired; or we may use pins to hold it in place. $n$ is a device or flap, hinged to an upright standard for controlling the movement of the pawl E. The frame B' is fastened to the frame B at the front, by means of bolts passing through both frames; and at the rear end there is an oscillating bar $d$, with an arm, $f$, projecting downward, to the lower end of which is fastened the chain G, and from bar $d$ are two arms, C, projecting forward, to the front ends of which are attached bars of metal, C''. One end of each is attached to the frame B', the joints working loosely, for raising and lowering the frame B' and the ploughs or cultivator or single plough. $k\ k$ are guides attached to frame B' for guiding it and holding it in its proper place while it is being raised or lowered. The plough H has a roller, $m$, in rear of the plough for levelling the furrow and smoothing the ground. When we wish to use the single plough the gang-plough is readily detached and the single plough supplied, by removing the bolts in the front of the frame and the rear, and attaching the plough thereto, and which is raised and lowered by the same means.

In the operation of our invention, the driver, on seat F, has control of the lever C', which he can operate without changing his position, and by drawing the lever toward him he causes the chain to tighten and shorten as the cam on the lower end of the lever revolves, thus turning the oscillating arm and elevating the projecting bars $b$, which elevate the ploughs to their desired position, when the pawl falls into the ratchet D, and holds them steadily in place. To relieve the pawl from the ratchet it is only necessary to draw back the lever C', allowing the pawl to come in contact with the flap $n$, which holds it up out of the ratchet until it is released therefrom when the pawl is relieved, and is again ready to catch when required. Thus we are able to raise or lower the gang-ploughs or cultivator at will by the driver on his seat, without raising the weight of the driver in so doing, as his weight is on the wheels entirely, and not on the movable frame B'.

Having thus fully described the construction of our invention, and its operation, what we claim as new, and desire to secure by Letters Patent, is—

1. The manner herein described of attaching the frame B′, with gang-ploughs attached, to the frame B, attached to driving-wheels, and of attaching to the same plough H, as described and set forth.

2. The manner herein described of raising and lowering the frame B′, with ploughs attached or single plough, by means of lever C′, pawl and ratchet D and E, and flap n, and chain G, in the manner set forth and described.

In testimony that we claim the above-described invention we have hereunto signed our names this 25th day of August, 1866.

RANSOM K. LARAWAY,
JAROME LARAWAY.

Witnesses:
 A. LAFEVER,
 REBECCA M. LAFEVER.